(12) United States Patent
Isono

(10) Patent No.: US 7,922,459 B2
(45) Date of Patent: Apr. 12, 2011

(54) PRESSURE GENERATION DEVICE

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 730 days.

(21) Appl. No.: 11/662,709

(22) PCT Filed: Mar. 29, 2006

(86) PCT No.: PCT/JP2006/007172
§ 371 (c)(1),
(2), (4) Date: Mar. 14, 2007

(87) PCT Pub. No.: WO2006/107064
PCT Pub. Date: Oct. 12, 2006

(65) Prior Publication Data
US 2008/0003110 A1    Jan. 3, 2008

(30) Foreign Application Priority Data

| Mar. 31, 2005 | (JP) | 2005-102256 |
| Mar. 31, 2005 | (JP) | 2005-102304 |
| Jun. 27, 2005 | (JP) | 2005-186064 |
| Mar. 1, 2006 | (JP) | 2006-055220 |

(51) Int. Cl.
*F04B 17/06* (2006.01)
(52) U.S. Cl. .......... 417/233; 417/571; 92/31; 74/57
(58) Field of Classification Search ........... 92/31, 140; 417/233, 571; 74/56, 57, 838, 839
See application file for complete search history.

(56) References Cited

U.S. PATENT DOCUMENTS

| 2,401,466 A | * | 6/1946 | Davis et al. ............... 123/51 BC |
| 2,415,618 A | * | 2/1947 | West ........................... 417/498 |
| 2,855,176 A | * | 10/1958 | Boteler ........................ 251/252 |
| 3,477,345 A | * | 11/1969 | Johnson ......................... 91/207 |
| 4,553,506 A | * | 11/1985 | Bekiaroglou ............... 123/45 R |
| 5,221,381 A |   | 6/1993 | Hurrell |

(Continued)

FOREIGN PATENT DOCUMENTS

CN    2660164    12/2004
(Continued)

OTHER PUBLICATIONS

Chinese Office Action (w/English Translation).

Primary Examiner — Charles G Freay
Assistant Examiner — Todd D Jacobs
(74) Attorney, Agent, or Firm — Oblon, Spivak, McClelland, Maier & Neustadt, L.L.P.

(57) ABSTRACT

A pressure-generating device includes an axle hub having a rotary shaft portion supported rotatably in a nonrotatable cylindrical support portion via bearings; a piston attached to the rotary shaft portion in a unitarily rotatable manner and so as to perform a pumping action, and, in cooperation with the rotary shaft portion, forming a pump chamber therebetween; a cam member and cam followers for converting a rotary motion of the axle hub in relation to the cylindrical support member to the pumping action of the piston; a suction path formed in the axle hub and enabling introduction of air into the pump chamber; and a discharge path formed in the axle hub and enabling discharge of air from the pump chamber.

20 Claims, 7 Drawing Sheets

U.S. PATENT DOCUMENTS

| | | | |
|---|---|---|---|
| 5,342,177 A | 8/1994 | Cheng | |
| 5,667,606 A * | 9/1997 | Renier | 152/421 |
| 5,947,696 A | 9/1999 | Baumgarten | |
| 6,505,590 B1 * | 1/2003 | Rao et al. | 123/90.24 |
| 2004/0216827 A1 | 11/2004 | Stanczak | |

FOREIGN PATENT DOCUMENTS

| | | |
|---|---|---|
| CN | 1228547 | 11/2005 |
| EP | 0 166 123 | 1/1986 |
| JP | 45 20471 | 7/1970 |
| JP | 49-63877 | 6/1974 |
| JP | 50 245 | 1/1975 |
| JP | 50 148912 | 11/1975 |
| JP | 58 109571 | 7/1983 |
| JP | 60 143177 | 9/1985 |
| JP | 63 263286 | 10/1988 |
| JP | 1 172003 | 7/1989 |
| JP | 1 237301 | 9/1989 |
| JP | 06-205563 | 7/1994 |
| JP | 8 144948 | 6/1996 |
| JP | 11-22638 | 1/1999 |
| JP | 11 139118 | 5/1999 |
| JP | 11 509157 | 8/1999 |
| JP | 2004-278363 | 10/2004 |
| JP | 2004 306862 | 11/2004 |
| KR | 2001-0054503 | 7/2001 |
| WO | WO 97/02961 | 1/1997 |
| WO | 2006/107064 | 10/2006 |

* cited by examiner

PRESSURE GENERATION DEVICE

TECHNICAL FIELD

The present invention relates to a pressure-generating device; for example, a pressure (air pressure) generating device capable of supplying pressurized air to a tire air chamber of a wheel including a disc wheel and a tire, the disc wheel being held on an axle hub of a vehicle and being rotatable with the axle hub, and the tire being mounted on the disc wheel to thereby form the tire air chamber therebetween.

BACKGROUND ART

A pressure-generating device of this kind is disclosed in, for example, Japanese Patent Application Laid-Open (kokai) No. 11-139118. In a pressure-generating device (air pressure regulator for tire) described in this publication, a pump unit is disposed on a member which rotates with an axle for rotatably driving an axle hub of a vehicle; the pump unit performs a reciprocating motion in the axial direction of the axle; and one end of a piston of the pump unit abuts an inclined plane of a cam member that is nonrotatable in relation to a wheel. The piston of the pump unit reciprocates in association with the rotation of the wheel.

According to the arrangement of the pressure-generating device described in the above publication, the axis of the piston of the pump unit is radially offset by a predetermined distance from the axis of the axle. Thus, the radius of the inclined plane of the cam member in contact with one end of the piston must be equal to or greater than the amount of the radial offset of the axis of the piston, thereby raising difficulty in reducing the size of the pressure-generating device and thus involving poor mountability in a vehicle. Furthermore, in order to achieve good wheel balance (balance of rotation), a counter weight (balance weight) for canceling the weight of the pump unit must be provided. This also raises difficulty in reducing the size of the pressure-generating device.

DISCLOSURE OF THE INVENTION

The present invention has been achieved for solving the above problems. A pressure-generating device of the present invention is characterized by comprising a rotary member having a rotary shaft portion supported rotatably in a nonrotatable support member via a bearing; a pumping member attached to the rotary shaft portion of the rotary member in a unitarily rotatable manner and in such a manner as to be able to perform a pumping action, and, in cooperation with the rotary shaft portion, forming a pump chamber therebetween; a motion-converting mechanism for converting a rotary motion of the rotary member in relation to the support member to the pumping action of the pumping member; a suction path formed in the rotary member and enabling introduction of fluid into the pump chamber; and a discharge path formed in the rotary member and enabling discharge of the fluid from the pump chamber.

In this case, the pressure-generating device can be configured such that the rotary member is an axle hub of a vehicle; the support member is a knuckle which rotatably supports the axle hub; and the fluid is air. Also, the pressure-generating device can be configured such that the pumping member is a piston which is attached to the rotary shaft portion in a unitarily rotatable manner and in such a manner as to be able to reciprocate and such that the motion-converting mechanism converts the rotary motion of the rotary member in relation to the support member to a reciprocating motion of the piston.

In this case, the pressure-generating device can be configured such that the rotary shaft portion has a coaxially formed cylinder bore which accommodates the piston in such a manner that the piston can reciprocate in an axial direction of the rotary shaft portion; the piston has a load transmission element which extends through the rotary shaft portion in such a manner that the load transmission element is movable in the axial direction of the rotary shaft portion and immovable in a direction of rotation of the rotary shaft portion; and the motion-converting mechanism comprises a cam follower provided at an outer end of the load transmission element with respect to a radial direction of the piston, and a cam member attached to the interior of the support member.

Also, the pressure-generating device can be configured such that the piston is cylindrically formed and attached to an outer circumference of the rotary shaft portion in a unitarily rotatable manner and in such a manner as to be able to axially reciprocate; a cylinder member intervenes between the support member and the rotary shaft portion, is provided unitarily with the support member, and accommodates the piston in such a manner that the piston can reciprocate axially; and the motion-converting mechanism is provided between the piston and the cylinder member.

Also, the pressure-generating device can be configured such that the rotary shaft portion has a cylinder bore which accommodates the piston in such a manner that the piston can reciprocate in a radial direction of the rotary shaft portion and such that the motion-converting mechanism comprises a cam follower provided at an outer end of the piston projecting outward from the cylinder bore, and a cylindrical cam attached to the interior of the support member.

Also, the cam member can have a cam groove into which the cam follower is fitted. The cam groove can have a cam face which is subjected to an axial load and a radial load from the rotary shaft portion via the cam follower and can have a V-shaped cross section. The cam follower fitted into the cam groove can be a ball.

Also, the load transmission element can be a shaft which extends through the piston in a radial direction of the piston and whose axial movement is guided by an axially elongated hole formed in the rotary shaft portion. The pressure-generating device can be configured such that the shaft is divided into two pieces within the piston and such that a spring intervening between the two pieces applies a radially outward force to the two pieces in a radial direction of the piston. Also, the pressure-generating device can be configured such that a roller intervenes between the axially elongated hole and the shaft and rolls along the axially elongated hole as the shaft moves in the axial direction of the rotary shaft portion. The roller can have a bearing which rollably supports the cam follower.

Also, the pressure-generating device can be configured such that the cam member enables the cam follower to axially reciprocate in an even number of geometric cycles in a circumferential direction of the rotary member and such that the cam followers are provided in a number equal to the number of geometric cycles. In this case, the pressure-generating device can be configured such that the cam member comprises a forward-movement cam and a backward-movement cam which are spaced a predetermined distance apart from each other in the axial direction of the rotary shaft portion; the cam followers comprise forward-movement cam followers engaged with the forward-movement cam and backward-movement cam followers engaged with the backward-movement cam; the number of geometric cycles in an even number is four; and the forward-movement cam followers and the backward-movement cam followers are arranged alternately with one another at circumferentially equal intervals. Also, the pressure-generating device can be configured such that the frontward-movement cam and the backward-movement cam are cam ring plates, respectively; the frontward-movement cam followers and the backward-movement cam followers are rollers, respectively; and the rollers are rollably engaged with the respective cam ring plates.

In the above-mentioned pressure-generating device according to the present invention, when the rotary member rotates in relation to the support member, the motion-converting mechanism converts a rotary motion of the rotary member to a pumping action of the pumping member, whereby the pumping member performs a pumping action. Accordingly, the volume of the pump chamber increases and decreases, whereby fluid is introduced into the pump chamber through the suction path and discharged from the pump chamber through the discharge path.

In the pressure-generating device according to the present invention, the rotary shaft portion of the rotary member is supported rotatably in the support member via the bearing, and the pumping member (piston) is attached to the rotary shaft portion of the rotary member in a unitarily rotatable manner and in such a manner as to be able to perform a pumping action and, in cooperation with the rotary shaft portion, forms the pump chamber therebetween. Accordingly, not only does the rotary member not require a balance weight for achieving balance of rotation, but also the pressure-generating device can be configured compact within the support member, thereby enabling a reduction in the size of the pressure-generating device.

The present invention can also be embodied such that the rotary shaft portion is rotatably supported by the support member via a first bearing and a second bearing which are axially spaced a predetermined distance apart from each other. In this case, the first bearing and the second bearing can ensure support rigidity in supporting the rotary member by the support member. The pressure-generating device can also be configured such that the motion-converting mechanism intervenes between the first bearing and the second bearing. This enables effective utilization of the space between the first bearing and the second bearing as a space for accommodating the motion-converting mechanism, so that the pressure-generating device can be configured compact.

The present invention can also be embodied such that a first seal member and a second seal member for sealing the first and second bearings intervene between the rotary shaft portion and the support member in such a manner as to sandwich the motion-converting mechanism and the first and second bearings therebetween. In this case, the first seal member and the second seal member can seal the first and second bearings as well as the motion-converting mechanism; i.e., the seal members can be used in common, so that the pressure-generating device can be reduced in size and cost.

BEST MODE FOR CARRYING OUT THE INVENTION

Figure 1:
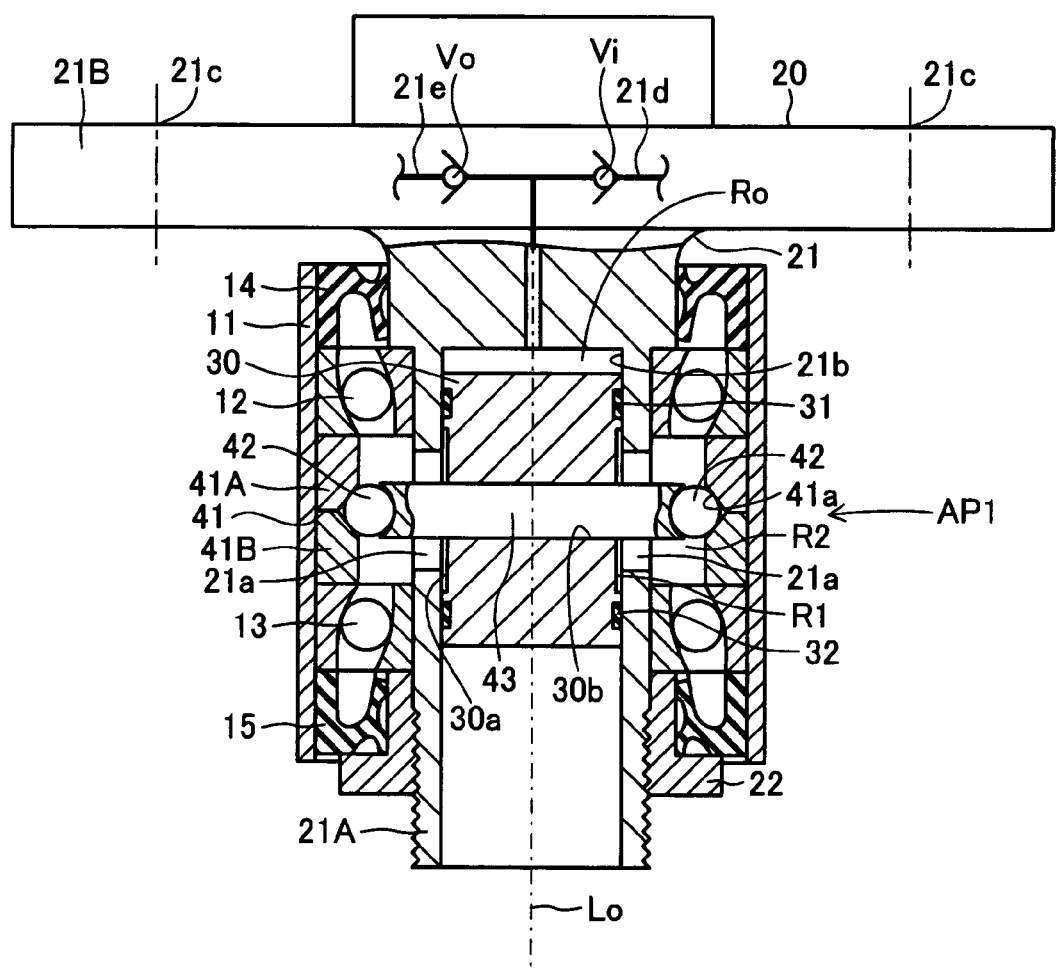
FIG. 1 is a sectional view schematically showing a first embodiment of a pressure-generating device according to the present invention.

Embodiments of the present invention will next be described with reference to the drawings. FIG. 1 shows a first embodiment of a pressure-generating device according to the present invention. A pressure-generating device AP1 of the first embodiment can supply pressurized air to a tire chamber (not shown) of a wheel of a vehicle. The pressure-generating device AP1 includes a cylindrical support portion 11, which serves as a support member and is a portion of a knuckle; an axle hub 20, which serves as a rotary member; a columnar piston 30, which serves as a pumping member; a cam member 41 and two cam followers 42, which cooperatively serve as a motion-converting mechanism for converting a rotary motion of the axle hub 20 in relation to the cylindrical support portion 11 to a reciprocating motion (a vertical motion in FIG. 1) of the piston 30; and a rod 43, which rotatably supports the cam followers 42.

The cylindrical support portion 11 is formed into a cylindrical shape having an axis Lo and is nonrotatable about the axis Lo. A rotary shaft portion 21A of the axle hub 20 is supported in the interior of the cylindrical support portion 11 rotatably about the axis Lo and liquid-tightly via a pair of bearings 12 and 13 and a pair of annular seal members 14 and 15. The paired bearings 12 and 13 are spaced a predetermined distance apart from each other in the axial direction of the rotary shaft portion 21A (along the axis Lo) and intervene between the cylindrical support portion 11 and the rotary shaft portion 21A while sandwiching the cam member 41 therebetween in the axial direction of the rotary shaft portion 21A, thereby enabling rotation of the axle hub 20 in relation to the cylindrical support portion 11; i.e., the knuckle. The paired annular seal members 14 and 15 are spaced a predetermined distance apart from each other in the axial direction of the rotary shaft portion 21A and intervene between the cylindrical support portion 11 and the rotary shaft portion 21A while sandwiching the cam member 41 and the bearings 12 and 13 therebetween in the axial direction of the rotary shaft portion 21A, thereby providing a liquid-tight seal between the cylindrical support portion 11 and the rotary shaft portion 21A.

The axle hub 20 includes a hub body 21 and a sleeve 22, which is liquid-tightly screw-engaged with the outer circumference of a lower end portion (as viewed in FIG. 1) of the hub body 21. The hub body 21 includes the rotary shaft portion 21A and an annular flange portion 21B. The rotary shaft portion 21A has a pair of axially elongated holes 21a and a cylinder bore 21b. The annular flange portion 21B has mounting portions 21c (detailed illustration is omitted) for a wheel (not shown). A suction path 21d and a discharge path 21e are formed in the rotary shaft portion 21A and in the annular flange portion 21B.

The paired axially elongated holes 21a collectively serve as a guide means for guiding the piston 30, the cam followers 42, and the rod 43 in such a manner that these members are rotatable unitarily with the axle hub 20 and can reciprocate in the axial direction of the rotary shaft portion 21A. The paired axially elongated holes 21a extend in the axial direction of the rotary shaft portion 21A and are spaced 180 degrees apart from each other in the circumferential direction of the rotary shaft portion 21A of the axle hub 20. The cylinder bore 21b extends in the axial direction of the rotary shaft portion 21A and accommodates the piston 30. The cylinder bore 21b, in cooperation with the piston 30, forms a pump chamber Ro in the rotary shaft portion 21A. The suction path 21d is adapted to lead (introduce) air into the pump chamber Ro and has a suction check valve Vi installed therein. The discharge path 21e is adapted to lead (discharge) air out from the pump chamber Ro and has a discharge check valve Vo installed therein. Pressurized air discharged from the pump chamber Ro can be supplied into a tire air chamber (not shown) of a wheel attached to the axle hub 20.

The piston 30 is inserted into the cylinder bore 21b of the rotary shaft portion 21A of the axle hub 20 via a pair of annular seal members 31 and 32 and is coaxially attached to the rotary shaft portion 21A of the axle hub 20 in a unitarily rotatable manner and in such a manner as to be able to axially reciprocate. The piston 30 has an annular groove 30a and a through hole 30b extending in a radial direction thereof. The paired annular seal members 31 and 32 are spaced a predetermined distance apart from each other in the axial direction of the piston 30 and intervene between the piston 30 and the rotary shaft portion 21A at respective, axial end portions of the piston 30, thereby providing an airtight, liquid-tight seal between the piston 30 and the rotary shaft portion 21A.

The annular groove 30a is formed on the outer circumference of the piston 30 between the paired annular seal members 31 and 32, whereby an annular space R1 is formed between the piston 30 and the rotary shaft portion 21A. The annular space R1 communicates with an annular space R2 formed between the paired annular seal members 14 and 15, through the axially elongated holes 21a formed in the rotary shaft portion 21A. The annular spaces R1 and R2 remain unchanged in volume during axial reciprocating motion of the piston 30 and are sealed by means of the four seal members 14, 15, 31, and 32. The annular spaces R1 and R2 and the like collectively serve as an oil chamber for accommodating a predetermined amount of lubrication oil. This oil chamber accommodates the bearings 12 and 13, the cam member 41, the cam followers 42, the rod 43, and the like.

The cam member 41 is a cylindrical cam attached unitarily (in an axially immovable manner and in a nonrotatable manner) to the cylindrical support portion 11 and consists of a pair of cam sleeves 41A and 41B, which are provided in axial contact with each other. The cam member 41 is disposed coaxially with the rotary shaft portion 21A. The cam member 41 has an annular cam portion 41a whose axial position varies. The cam portion 41a is a cam groove, into which the cam followers 42 are fitted. The cam portion 41a has a cam face which is subjected to an axial load (a vertical load in FIG. 1) and a radial load (a horizontal load in FIG. 1) from the rotary shaft portion 21A via the cam followers 42. This cam face has a V-shaped cross section and has an even number of geometric cycles (e.g., two geometric cycles) along the circumferential direction of the rotary shaft portion 21A.

The cam followers 42 are balls which are rotatably attached to respective outer ends of the rod 43 with respect to a radial direction of the piston 30. The cam followers 42 are engaged with the cam portion (cam groove) 41a at the end portions with respect to the piston radial direction orthogonal to the axis Lo. Through relative rotation in relation to the cam member 41, the cam followers 42, together with the rod 43, can move in the axial direction of the rotary shaft portion 21A (vertically in FIG. 1). The rod 43 serves as a load transmission element, which is installed in the through hole 30b of the piston 30 in such a manner as to be movable in a radial direction of the piston 30 (the axial direction of the through hole 30b). The rod 43 extends through the axially elongated holes 21a of the rotational shaft portion 21A in such a manner as to be movable in the axial direction of the rotary shaft portion 21A and to be immovable in the direction of rotation of the rotary shaft portion 21A.

In the thus-configured pressure-generating device AP1 of the first embodiment, when the axle hub 20 rotates in relation to the cylindrical support portion 11, the piston 30, the rod 43, and the cam followers 42 rotate unitarily with the axle hub 20 and make relative rotation in relation to the cam member 41 to thereby move axially. Accordingly, the rotary motion of the axle hub 20 can be converted to the reciprocating motion of the piston 30. The reciprocating motion of the piston 30 can increase and decrease the volume of the pump chamber Ro. Thus, air can be introduced into the pump chamber Ro through the suction path 21d in which the suction check valve Vi is installed, and air can be discharged from the pump chamber Ro through the discharge path 21e in which the discharge check valve Vo is installed. The discharged air (pressurized air) can be supplied into the tire air chamber (not shown) of a wheel attached to the axle hub 20.

In the pressure-generating device AP1 of the first embodiment, the rotary shaft portion 21A of the axle hub 20 is supported rotatably in the cylindrical support portion 11 via the bearings 12 and 13, and the piston 30 is coaxially attached to the rotary shaft portion 21A of the axle hub 20 in a unitarily rotatable manner and in such a manner as to be able to axially reciprocate (to perform a pumping action), whereby the pump chamber Ro exposed to the rotary shaft portion 21A is formed. Accordingly, not only does the axle hub 20 not require a balance weight for achieving balance of rotation, but also the pressure-generating device AP1 can be configured compact within the cylindrical support portion 11, thereby enabling a reduction in the size of the pressure-generating device AP1.

In the pressure-generating device AP1 of the first embodiment, the rotary shaft portion 21A of the axle hub 20 is rotatably supported by the cylindrical support portion 11 via the paired bearings 12 and 13, which are spaced a predetermined distance apart from each other in the axial direction of the rotary shaft portion 21A. Accordingly, the paired bearings 12 and 13 can ensure support rigidity in supporting the axle hub 20 by the cylindrical support portion 11. Also, the cam member 41 and the cam followers 42, which collectively serve as the motion-converting mechanism, intervene between the paired bearings 12 and 13. This enables effective utilization of the space between the paired bearings 12 and 13 as a space for accommodating the motion-converting mechanism, so that the pressure-generating device AP1 can be configured compact.

In the pressure-generating device AP1 of the first embodiment, the paired annular seal members 14 and 15 for sealing the paired bearings 12 and 13 intervene between the rotary shaft portion 21A of the axle hub 20 and the cylindrical support portion 11 in such a manner as to sandwich the cam member 41 and the two bearings 12 and 13 in the axial direction of the rotary shaft portion 21A. Accordingly, the paired annular seal members 14 and 15 can seal the paired bearings 12 and 13 as well as the cam member 41 and the cam followers 42, which collectively serve as the motion-converting mechanism; i.e., the seal members can be used in common, so that the pressure-generating device AP1 can be reduced in size and cost.

In the pressure-generating device AP1 of the first embodiment, the paired annular seal members 31 and 32 for providing a liquid-tight seal between the piston 30 and the rotary shaft portion 21A of the axle hub 20 are axially spaced a predetermined distance apart from each other, and the paired annular seal members 14 and 15 for providing a liquid-tight seal between the rotary shaft portion 21A of the axle hub 20 and the cylindrical support portion 11 are axially spaced a predetermined distance apart from each other. The oil chamber (annular spaces R1 and R2), which is sealed by the four seal members 14, 15, 31, and 32 and accommodates operating oil in a predetermined amount, accommodates the bearings 12 and 13, the cam member 41, the cam followers 42, the rod 43, and the like. Accordingly, lubricity is ensured for sliding portions, so that the sliding portions can be reduced in sliding resistance and improved in durability.

Figure 2:
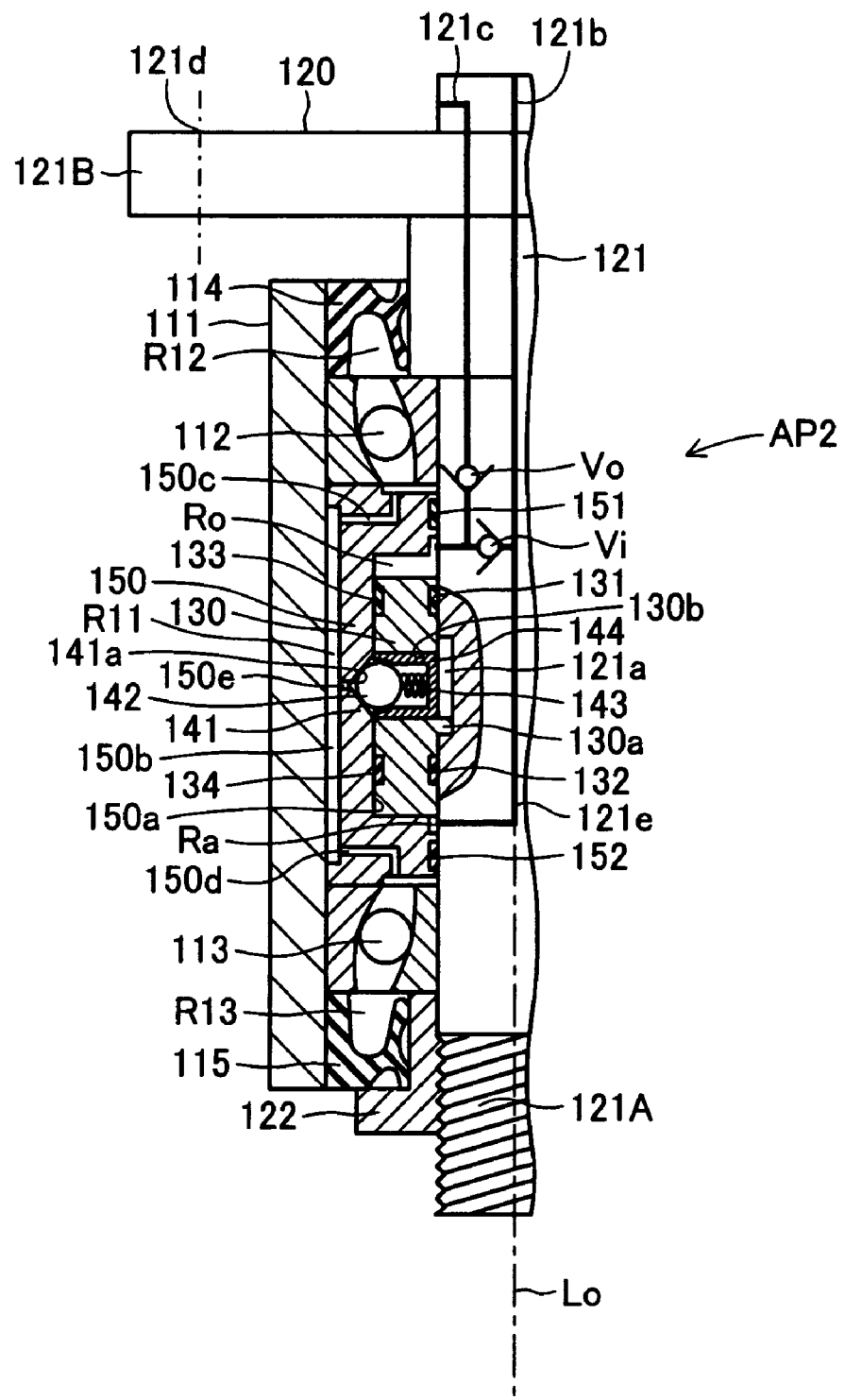
FIG. 2 is a sectional view schematically showing a second embodiment of a pressure-generating device according to the present invention.

FIG. 2 shows a second embodiment of a pressure-generating device according to the present invention. A pressure-generating device AP2 of the second embodiment can supply pressurized air to a tire chamber (not shown) of a wheel of a vehicle. The pressure-generating device AP2 includes a cylindrical support portion 111, which serves as a support member and is a portion of a knuckle; an axle hub 120, which serves as a rotary member; a cylindrical piston 130, which serves as a pumping member; a cylindrical cam 141 and a cam follower 142, which cooperatively serve as a motion-converting mechanism for converting a rotary motion of the axle hub 120 in relation to the cylindrical support portion 111 to a reciprocating motion of the piston 130; and a cylinder member 150, which accommodates the piston 130.

The cylindrical support portion 111 is formed into a cylindrical shape having the axis Lo and is nonrotatable about the axis Lo. A rotary shaft portion 121A of the axle hub 120 is supported in the interior of the cylindrical support portion 111 rotatably about the axis Lo and liquid-tightly via a pair of bearings 112 and 113 and a pair of annular seal members 114 and 115. The paired bearings 112 and 113 are spaced a predetermined distance apart from each other in the axial direction of the rotary shaft portion 121A (along the axis Lo) and intervene between the cylindrical support portion 111 and the rotary shaft portion 121A while sandwiching the cylinder member 150 therebetween in the axial direction of the rotary shaft portion 121A, thereby enabling rotation of the axle hub 120 in relation to the cylindrical support portion 111; i.e., the knuckle. The paired annular seal members 114 and 115 are spaced a predetermined distance apart from each other in the axial direction of the rotary shaft portion 121A and intervene between the cylindrical support portion 111 and the rotary shaft portion 121A while sandwiching the cylinder member 150 and the bearings 112 and 113 therebetween in the axial direction of the rotary shaft portion 121A, thereby providing a liquid-tight seal between the cylindrical support portion 111 and the rotary shaft portion 121A.

The axle hub 120 includes a hub body 121 and a sleeve 122, which is liquid-tightly screw-engaged with the outer circumference of a lower end portion of the hub body 121. The hub body 121 includes the rotary shaft portion 121A and an annular flange portion 121B. The rotary shaft portion 121A has an axial groove 121a, a suction path 121b, and a discharge path 121c. The annular flange portion 121B has mounting portions 121d (detailed illustration is omitted) for a wheel (not shown).

The axial groove 121a is a guide means for axially guiding a projection 130a formed on the inner circumference of the piston 130 and is formed on the outer circumference of the rotary shaft portion 121A of the axle hub 120. The suction path 121b is adapted to lead (introduce) air into the pump chamber Ro formed between the piston 130 and the cylinder member 150 and has the suction check valve Vi installed therein. The discharge path 121c is adapted to lead (discharge) air out from the pump chamber Ro and has the discharge check valve Vo installed therein. Pressurized air discharged from the pump chamber Ro can be supplied into a tire air chamber (not shown) of a wheel attached to the axle hub 120.

The piston 130 is accommodated in the cylinder member 150 and disposed outside the rotary shaft portion 121A of the axle hub 120. The piston 130 has the above-mentioned projection 130a and has a mounting hole 130b, which extends in a radial direction of the piston 130 and into which the cam follower 142, a spring 143, and a holder 144 are attached. The piston 130 is fitted, via the projection 130a, into the axial groove 121a of the rotary shaft portion 121A in such a manner as to be rotatable unitarily with the rotary shaft portion 121A and to be able to axially reciprocate, and is coaxially attached to the rotary shaft portion 121A of the axle hub 120 in a unitarily rotatable manner and in such a manner as to be able to axially reciprocate.

The piston 130 is fitted onto the rotary shaft portion 121A of the axle hub 120 via a pair of annular seal members 131 and 132 and is fitted into a cylinder bore 150a of the cylinder member 150 via a pair of annular seal members 133 and 134, thereby forming the above-mentioned pump chamber Ro and an atmospheric chamber Ra in cooperation with the outer circumference of the rotary shaft portion 121A and the inner periphery of the cylinder member 150. The atmospheric chamber Ra communicates with the atmosphere through a communication path 121e formed in the rotary shaft portion 121A and a portion of the suction path 121b on an atmospheric side of the suction check valve Vi.

The paired annular seal members 131 and 132 are spaced a predetermined distance apart from each other in the axial direction of the rotary shaft portion 121A and intervene between the piston 130 and the rotary shaft portion 121A at respective axial end portions of the piston 130, thereby providing an airtight, liquid-tight seal between the piston 130 and the rotary shaft portion 121A. The paired annular seal members 133 and 134 are spaced a predetermined distance apart from each other in the axial direction of the rotary shaft portion 121A and intervene between the piston 130 and the cylinder member 150 at respective axial end portions of the piston 130, thereby providing an airtight, liquid-tight seal between the piston 130 and the cylinder member 150.

The cylinder member 150 is formed into a cylindrical shape; is fitted, within the cylindrical support portion 111, onto the rotary shaft portion 121A of the axle hub 120 via a pair of annular seal members 151 and 152; and intervenes between the cylindrical support portion 111 and the rotary shaft portion 121A of the axle hub 120. The cylinder member 150 is disposed coaxially with the rotary shaft portion 121A and is attached unitarily (in an axially immovable manner and in a nonrotatable manner) to the cylindrical support portion 111. The cylinder member 150 has the cylinder bore 150a, which accommodates the piston 130 in such a manner as to be able to reciprocate in the axial direction of the rotary shaft portion 121A, and an annular groove 150b formed on the outer circumference thereof.

The annular groove 150b forms an annular space R11 between the cylindrical support portion 111 and the cylinder member 150. This annular space R11 communicates with an annular space R12 formed between the annular seal members 114 and 151 through a communication bore 150c formed in the cylinder member 150 and communicates with an annular space R13 formed between the annular seal members 115 and 152 through a communication bore 150d formed in the cylinder member 150. The annular spaces R11, R12, and R13 collectively serve as an oil chamber for accommodating a predetermined amount of lubrication oil. The lubrication oil accommodated in this oil chamber is supplied to the bearings 112 and 113 and the annular seal members 114, 115, 151, and 152 as well as to a portion of engagement between the cylindrical cam 141 and the cam follower 142, a sliding portion of the piston 130, and the like through a communication bore 150e formed in the cylinder member 150.

The cylindrical cam 141 is integrally formed on the inner circumference of the cylinder member 150 and is disposed coaxially with the rotary shaft portion 121A. The cylindrical cam 141 has an annular cam groove 141a whose position varies in the axial direction of the rotary shaft portion 121A. The cam follower 142 is fitted into the cam groove 141a. The cam groove 141a has a cam face which is subjected to an axial load (a vertical load in FIG. 2) and a radial load (a horizontal load in FIG. 2) from the cam follower 142. This cam face has a V-shaped cross section and has an even number of geometric cycles (e.g., two geometric cycles) along the circumferential direction of the rotary shaft portion 121A.

The cam follower 142 is a ball which is rotatably attached to the holder 144, which is inserted into the mounting hole 130b of the piston 130. While being subjected to force which the spring 143 exerts in a radially outward direction of the piston 130, the cam follower 142 is engaged with the cam groove 141a. The spring 143 intervenes between the cam follower 142 and the holder 144 and applies force to the cam follower 142 in a radially outward direction of the piston 130. The holder 144 is formed into a closed-bottomed tubular shape and is provided in the mounting hole 130b of the piston 130 in such a manner as to be movable in a radial direction of the piston 130.

In the thus-configured pressure-generating device AP2 of the second embodiment, when the axle hub 120 rotates in relation to the cylindrical support portion 111, the piston 130 and the cam follower 142 rotate unitarily with the axle hub 120 and make relative rotation in relation to the cylindrical cam 141 to thereby move axially. Accordingly, the rotary motion of the axle hub 120 can be converted to the reciprocating motion of the piston 130. The reciprocating motion of the piston 130 can increase and decrease the volume of the pump chamber Ro. Thus, air can be introduced into the pump chamber Ro through the suction path 121b in which the suction check valve Vi is installed, and air can be discharged from the pump chamber Ro through the discharge path 121c in which the discharge check valve Vo is installed. The discharged air (pressurized air) can be supplied into the tire air chamber (not shown) of a wheel attached to the axle hub 120.

In the pressure-generating device AP2 of the second embodiment, the rotary shaft portion 121A of the axle hub 120 is supported rotatably in the cylindrical support portion 11i via the bearings 112 and 113, and the piston 130 is coaxially attached to the rotary shaft portion 121A of the axle hub 120 in a unitarily rotatable manner and in such a manner as to be able to axially reciprocate (to perform a pumping action), whereby the pump chamber Ro exposed to the rotary shaft portion 121A is formed. Accordingly, not only does the axle hub 120 not require a balance weight for achieving balance of rotation, but also the pressure-generating device AP2 can be configured compact within the cylindrical support portion 111, thereby enabling a reduction in the size of the pressure-generating device AP2.

In the pressure-generating device AP2 of the second embodiment, the rotary shaft portion 121A of the axle hub 120 is rotatably supported by the cylindrical support portion 111 via the paired bearings 112 and 113, which are spaced a predetermined distance apart from each other in the axial direction of the rotary shaft portion 121A. Accordingly, the paired bearings 112 and 113 can ensure support rigidity in supporting the axle hub 120 by the cylindrical support portion 111. Also, the cylindrical cam 141 and the cam follower 142, which collectively serve as the motion-converting mechanism, intervene between the paired bearings 112 and 113. This enables effective utilization of the space between the paired bearings 112 and 113 as a space for accommodating the motion-converting mechanism, so that the pressure-generating device AP2 can be configured compact.

In the pressure-generating device AP2 of the second embodiment, the paired annular seal members 114 and 115 for sealing the paired bearings 112 and 113 intervene between the rotary shaft portion 121A of the axle hub 120 and the cylindrical support portion 111 in such a manner as to sandwich the cylinder member 150 and the two bearings 112 and 113 in the axial direction of the rotary shaft portion 121A. Accordingly, the paired annular seal members 114 and 115 can seal the paired bearings 112 and 113 as well as the cylindrical cam 141 and the cam follower 142, which collectively serve as the motion-converting mechanism; i.e., the seal members can be used in common, so that the pressure-generating device AP2 can be reduced in size and cost.

In the pressure-generating device AP2 of the second embodiment, the oil chamber (annular spaces R12 and R13), which is sealed by the annular seal members 114, 115, 131 to 134, 151, and 152 and accommodates operating oil in a predetermined amount, accommodates the bearings 112 and 113. Also, lubrication oil can be supplied from the oil chamber (annular space R11) to a portion of engagement between the cylindrical cam 141 and the cam follower 142, a sliding portion of the piston 130, and the like through the communication bore 150e. Accordingly, lubricity is ensured for sliding portions, so that the sliding portions can be reduced in sliding resistance and improved in durability.

Figure 3:
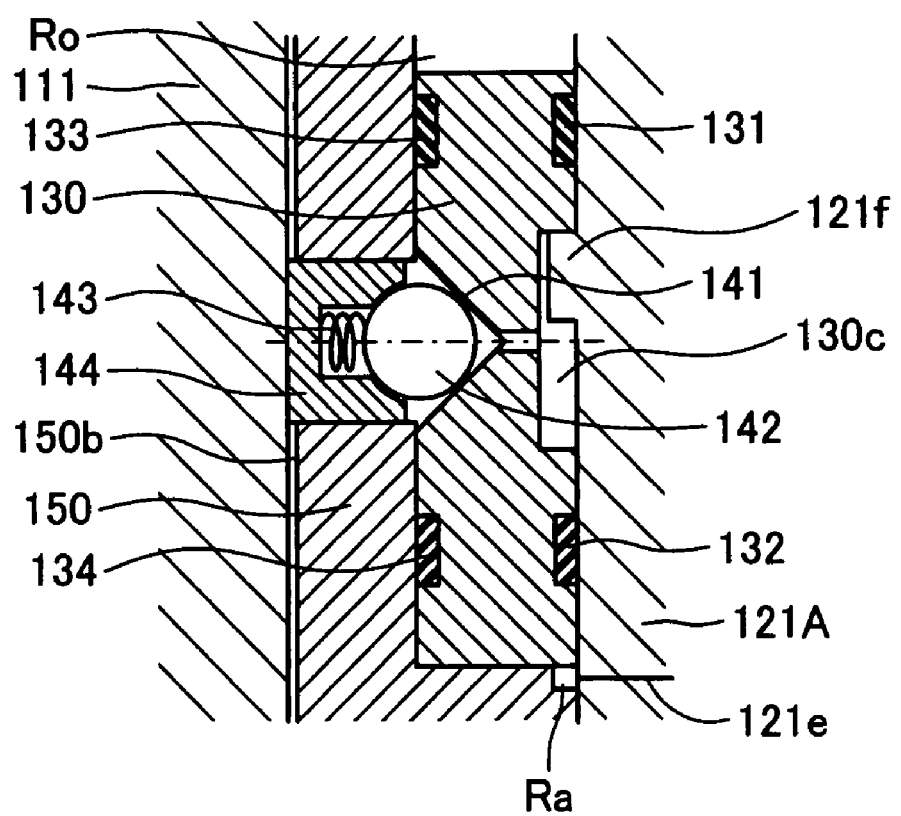
FIG. 3 is a partial, sectional view schematically showing a modified embodiment of the second embodiment shown in FIG. 2.

In the pressure-generating device AP2 of the second embodiment, the cam follower 142 provided on the outer circumference of the piston 130 and the cylindrical cam 141 provided on the inner circumference of the cylinder member 150 constitute the motion-converting mechanism (inscribed-cam-type motion-converting mechanism) for converting a rotary motion of the axle hub 120 in relation to the cylindrical support portion 111 to a reciprocating motion of the piston 130. However, as in the case of a modified embodiment shown in FIG. 3, the cylindrical cam 141 provided on the outer circumference of the piston 130 and the cam follower 142 provided on the inner circumference of the cylinder member 150 may constitute the motion-converting mechanism (circumscribed-cam-type motion-converting mechanism) for converting a rotary motion of the axle hub 120 in relation to the cylindrical support portion 111 to a reciprocating motion of the piston 130.

In the pressure-generating device AP2 of the second embodiment, the projection 130a is formed on the inner circumference of the piston 130; the axial groove 121a is formed on the outer circumference of the rotary shaft portion 121A; and the projection 130a (piston 130) is fitted into the axial groove 121a (rotary shaft portion 121A) in a unitarily rotatable manner and in such a manner as to be able to axially reciprocate. However, as in the case of the modified embodiment shown in FIG. 3, the configuration may be such that an axial groove 130c is formed in the inner circumference of the piston 130; a projection 121f is formed on the outer circumference of the rotary shaft portion 121A; and the axial groove 130c (piston 130) is fitted to the projection 121f (rotary shaft portion 121A) in a unitarily rotatable manner and in such a manner as to be able to axially reciprocate.

Figure 4:
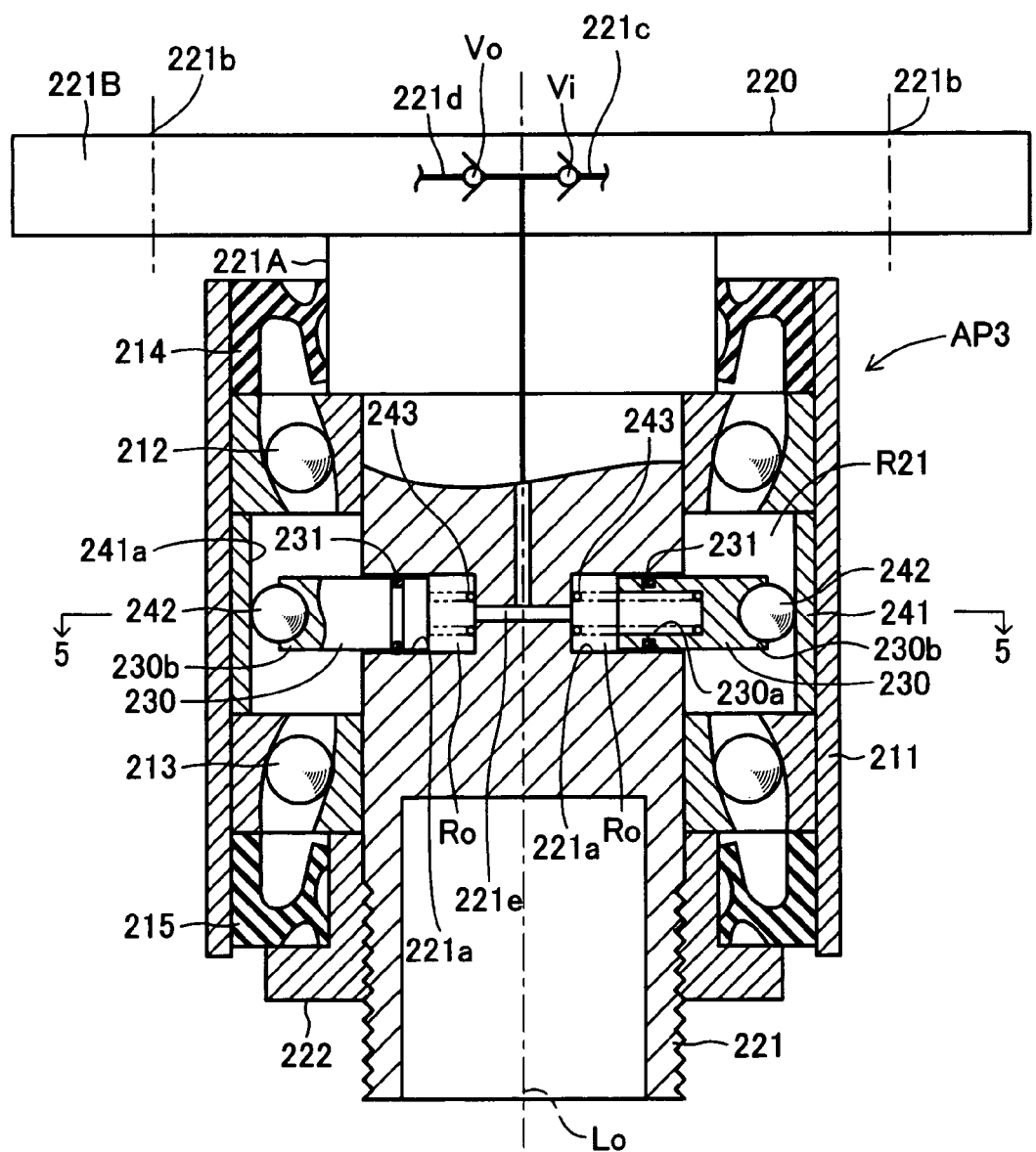
FIG. 4 is a sectional view schematically showing a third embodiment of a pressure-generating device according to the present invention.
Figure 5:
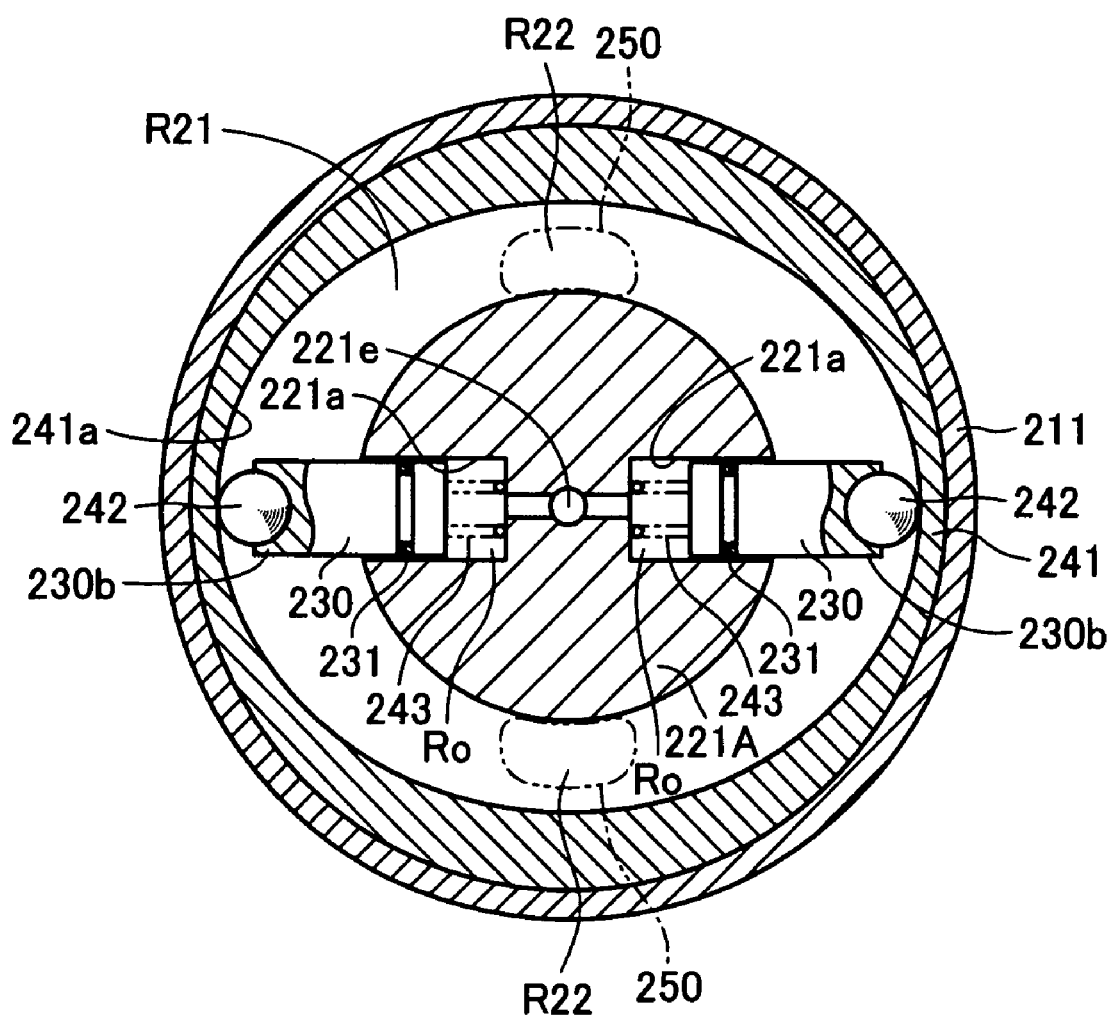
FIG. 5 is a sectional view taken along line 5-5 of the third embodiment shown in FIG. 4.

FIGS. 4 and 5 show a third embodiment of a pressure-generating device according to the present invention. A pressure-generating device AP3 of the third embodiment can supply pressurized air to a tire chamber (not shown) of a wheel of a vehicle. The pressure-generating device AP3 includes a cylindrical support portion 211, which serves as a support member and is a portion of a knuckle; an axle hub 220, which serves as a rotary member; two pistons 230, which collectively serve as a pumping member; and a cam member 241 and two cam followers 242, which cooperatively serve as a motion-converting mechanism for converting a rotary motion of the axle hub 220 in relation to the cylindrical support portion 211 to a reciprocating motion of the pistons 230.

The cylindrical support portion 211 is formed into a cylindrical shape having the axis Lo and is nonrotatable about the axis Lo. A rotary shaft portion 221A of the axle hub 220 is supported in the interior of the cylindrical support portion 211 rotatably about the axis Lo and liquid-tightly via a pair of bearings 212 and 213 and a pair of annular seal members 214 and 215. The paired bearings 212 and 213 are spaced a predetermined distance apart from each other in the axial direction of the rotary shaft portion 221A (along the axis Lo) and intervene between the cylindrical support portion 211 and the rotary shaft portion 221A while sandwiching the cam member 241 therebetween in the axial direction of the rotary shaft portion 221A, thereby enabling rotation of the axle hub 220 in relation to the cylindrical support portion 211; i.e., the knuckle. The paired annular seal members 214 and 215 are spaced a predetermined distance apart from each other in the axial direction of the rotary shaft portion 221A and intervene between the cylindrical support portion 211 and the rotary shaft portion 221A while sandwiching the cam member 241 and the bearings 212 and 213 therebetween in the axial direction of the rotary shaft portion 221A, thereby providing a liquid-tight seal between the cylindrical support portion 211 and the rotary shaft portion 221A.

The axle hub 220 includes a hub body 221 and a sleeve 222, which is liquid-tightly screw-engaged with the outer circumference of a lower end portion of the hub body 221. The hub body 221 includes the rotary shaft portion 221A and an annular flange portion 221B. The rotary shaft portion 221A has a pair of cylinder bores 221a; i.e., two cylinder bores 221a. The annular flange portion 221B has mounting portions 221b (detailed illustration is omitted) for a wheel (not shown). A suction path 221c and a discharge path 221d are formed in the rotary shaft portion 221A and in the annular flange portion 221B.

The two cylinder bores 221a are formed in the rotary shaft portion 221A of the axle hub 220 in such a manner as to extend in a radial direction of the rotary shaft portion 221A and are spaced 180 degrees apart from each other in the circumferential direction of the rotary shaft portion 221A. The cylinder bores 221a accommodate the respective pistons 230 in such a manner that the pistons 230 can reciprocate in a radial direction of the rotary shaft portion 221A. The cylinder bores 221a, in cooperation with the respective pistons 230, form respective pump chambers Ro in the rotary shaft portion 221A. The pump chambers Ro communicate with each other through a communication bore 221e provided in the rotary shaft portion 221A.

The suction path 221c is adapted to lead (introduce) air into the pump chambers Ro and has the suction check valve Vi installed therein. The discharge path 221d is adapted to lead (discharge) air out from the pump chambers Ro and has the discharge check valve Vo installed therein. Pressurized air discharged from the pump chambers Ro can be supplied into a tire air chamber (not shown) of a wheel attached to the axle hub 220.

The pistons 230 each assume a columnar form and are inserted into the respective cylinder bores 221a of the rotary shaft portion 221A of the axle hub 220 via respective annular seal members 231. The pistons 230 are rotatable unitarily with the rotary shaft portion 221A of the axle hub 220 and can reciprocate in the axial direction of the cylinder bores 221a. The pistons 230 each have a recess portion 230a for accommodating a portion of a compression coil spring 243. The annular seal members 231 are fitted into respective annular grooves formed on the outer circumferences of the pistons 230, thereby providing an airtight, liquid-tight seal between the rotary shaft portion 221A and the pistons 230.

The cam member 241 is a cylindrical cam attached unitarily (in an axially immovable manner and in a nonrotatable manner) to the cylindrical support portion 211 and is disposed coaxially with the rotary shaft portion 221A. The cam member 241 has an elliptic cam face 241a on its inner circumference. The cam followers 242 are engaged with the cam face 241a. The cam face 241a can cause the cam followers 242 and the pistons 230 to make two reciprocations in the axial direction of the pistons 230 while the rotary shaft portion 221A makes one rotation in relation to the cylindrical support portion 211.

The cam followers 242 are balls which are rotatably attached to respective outer end portions 230b of the pistons 230 projecting outward from the respective cylinder bores 211a. The cam followers 242 are rollably engaged with the cam face 241a of the cam member 241 at the respective outer end portions 230b. Through relative rotation in relation to the cam member 241, the cam followers 242, together with the pistons 230, can move in the axial direction of the pistons 230. An annular space R21, which accommodates the cam followers 242 and the like, is sealed by means of the seal members 214, 215, 231, and 231. The annular space R21 accommodates a predetermined amount of lubrication oil for lubricating the bearings 212 and 213, the cam member 241, the cam followers 242, the pistons 230, and the like.

The third embodiment has air chambers R22 (see FIG. 5), which collectively serve as a volume-change-reducing means for reducing a change in volume of the annular space R21 associated with the reciprocating motion of the two pistons 230. The air chambers R22 decrease in volume as the volume of the annular space R21 decreases, and increase in volume as the volume of the annular space R21 increases. The air chambers R22 are implemented by respective air bags 250, which are attached to the outer circumference of the rotary shaft portion 221A in a unitarily rotatable manner. The air bags 250 are formed from an elastic, airtight material such as rubber and confine compressed air therein. The air bags 250 shrink as the inner pressure of the annular space R21 increases in association with a reduction in volume of the annular space R21, and inflate as the inner pressure of the annular space R21 drops in association with an increase in volume of the annular space R21. This reduces the magnitude of an increase and decrease in the inner pressure of the annular space R21 during operation, thereby reducing a pump loss associated with the increase and decrease of pressure.

In the thus-configured pressure-generating device AP3 of the third embodiment, when the axle hub 220 rotates in relation to the cylindrical support portion 211, the pistons 230 and the cam followers 242 rotate unitarily with the axle hub 220 and make relative rotation in relation to the cam member 241 to thereby move axially. Accordingly, the rotary motion of the axle hub 220 can be converted to the reciprocating motion of the pistons 230. The reciprocating motion of the pistons 230 can increase and decrease the volume of the pump chamber Ro. Thus, air can be introduced into the pump chambers Ro through the suction path 221c in which the suction check valve Vi is installed and through the communication bore 221e, and air can be discharged from the pump chambers Ro through the communication bore 221e and through the discharge path 221d in which the discharge check valve Vo is installed. The discharged air (pressurized air) can be supplied into the tire air chamber (not shown) of a wheel attached to the axle hub 220.

In the pressure-generating device AP3 of the third embodiment, the rotary shaft portion 221A of the axle hub 220 is supported rotatably in the cylindrical support portion 211 via the bearings 212 and 213, and the pistons 230 are attached to the rotary shaft portion 221A of the axle hub 220 in a unitarily rotatable manner and in such a manner as to be able to axially reciprocate (to perform a pumping action), whereby the pump chambers Ro exposed to the rotary shaft portion 221A are formed. Accordingly, not only does the axle hub 220 not require a balance weight for achieving balance of rotation, but also the pressure-generating device AP3 can be configured compact within the cylindrical support portion 211, thereby enabling a reduction in the size of the pressure-generating device AP3.

In the pressure-generating device AP3 of the third embodiment, the rotary shaft portion 221A of the axle hub 220 is rotatably supported by the cylindrical support portion 211 via the paired bearings 212 and 213, which are spaced a predetermined, distance apart from each other in the axial direction of the rotary shaft portion 221A. Accordingly, the paired bearings 212 and 213 can ensure support rigidity in supporting the axle hub 220 by the cylindrical support portion 211. Also, the cam members 241 and the cam followers 242, which collectively serve as the motion-converting mechanism, intervene between the paired bearings 212 and 213. This enables effective utilization of the space between the paired bearings 212 and 213 as a space for accommodating the motion-converting mechanism, so that the pressure-generating device AP3 can be configured compact.

In the pressure-generating device AP3 of the third embodiment, the paired annular seal members 214 and 215 for sealing the paired bearings 212 and 213 intervene between the rotary shaft portion 221A of the axle hub 220 and the cylindrical support portion 211 in such a manner as to sandwich the cam member 241 and the two bearings 212 and 213 in the axial direction of the rotary shaft portion 221A. Accordingly, the paired annular seal members 214 and 215 can seal the paired bearings 212 and 213 as well as the cam member 241 and the cam followers 242, which collectively serve as the motion-converting mechanism; i.e., the seal members can be used in common, so that the pressure-generating device AP3 can be reduced in size and cost.

In the pressure-generating device AP3 of the third embodiment, the annular seal members 231 are provided for providing a liquid-tight seal between the pistons 230 and the rotary shaft portion 221A of the axle hub 220, and the annular seal members 214 and 215 for providing a liquid-tight seal between the rotary shaft portion 221A of the axle hub 220 and the cylindrical support portion 211 are axially spaced a predetermined distance apart from each other. The annular space R21, which is sealed by these seal members 214, 215, 231, and 231 and accommodates operating oil in a predetermined amount, accommodates the bearings 212 and 213, the cam member 241, the cam followers 242, the pistons 230, and the like. Accordingly, lubricity is ensured for sliding portions, so that the sliding portions can be reduced in sliding resistance and improved in durability.

Figure 6:
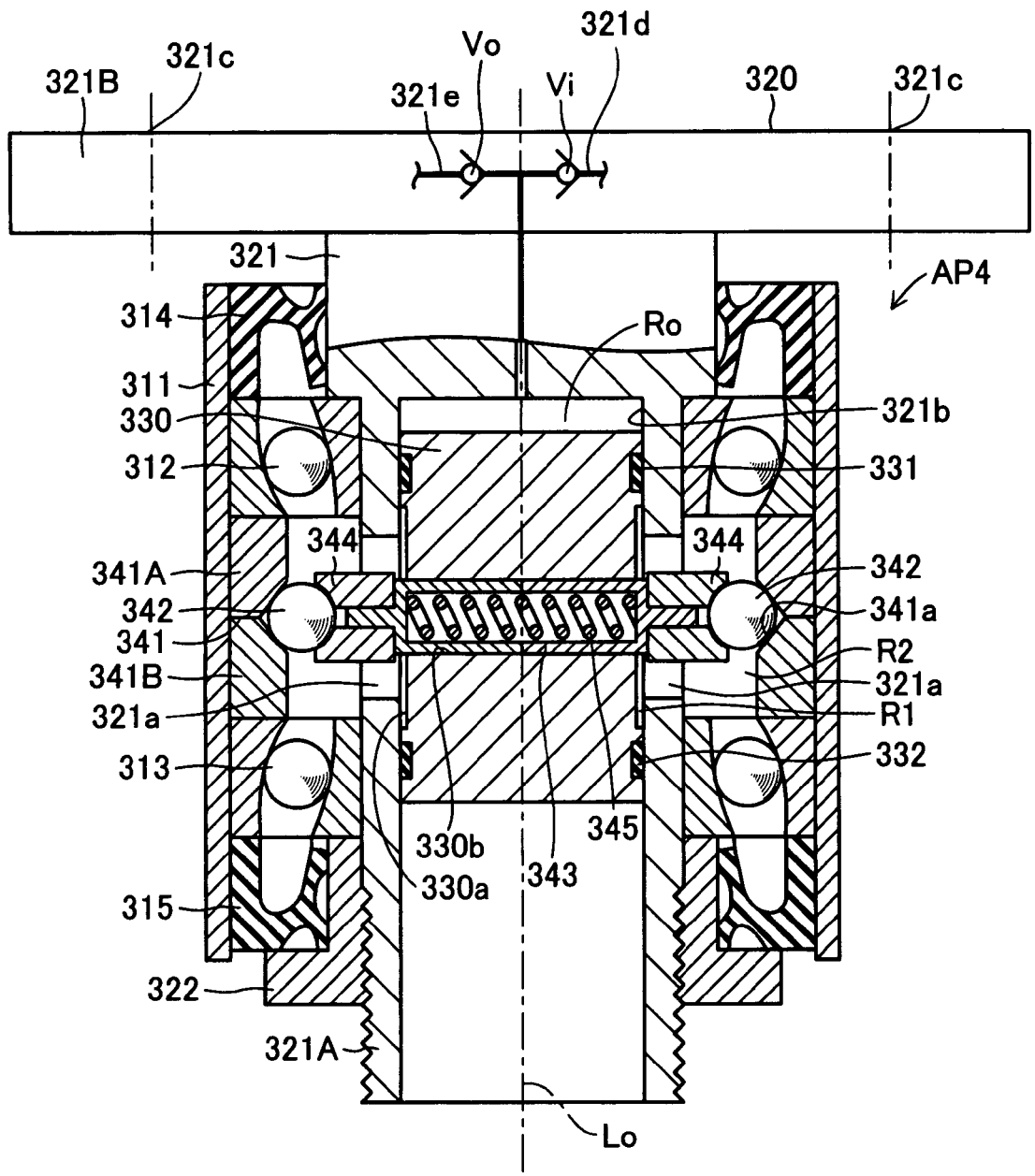
FIG. 6 is a sectional view schematically showing a fourth embodiment of a pressure-generating device according to the present invention.

FIG. 6 shows a fourth embodiment of a pressure-generating device according to the present invention. A pressure-generating device AP4 of the fourth embodiment can supply pressurized air to a tire chamber (not shown) of a wheel of a vehicle. The pressure-generating device AP4 includes a cylindrical support portion 311, which serves as a support member and is a portion of a knuckle; an axle hub 320, which serves as a rotary member; a columnar piston 330, which serves as a pumping member; a cam member 341 and two cam followers 342, which cooperatively serve as a motion-converting mechanism for converting a rotary motion of the axle hub 320 in relation to the cylindrical support portion 311 to a reciprocating motion of the piston 330; and a shaft 343, which rotatably supports the cam followers 342.

The cylindrical support portion 311 is formed into a cylindrical shape having the axis Lo and is nonrotatable about the axis Lo. A rotary shaft portion 321A of the axle hub 320 is supported in the interior of the cylindrical support portion 311 rotatably about the axis Lo and liquid-tightly via a pair of bearings 312 and 313 and a pair of annular seal members 314 and 315. The paired bearings 312 and 313 are spaced a predetermined distance apart from each other in the axial direction of the rotary shaft portion 321A (along the axis Lo) and intervene between the cylindrical support portion 311 and the rotary shaft portion 321A while sandwiching the cam member 341 therebetween in the axial direction of the rotary shaft portion 321A, thereby enabling rotation of the axle hub 320 in relation to the cylindrical support portion 311; i.e., the knuckle. The paired annular seal members 314 and 315 are spaced a predetermined distance apart from each other in the axial direction of the rotary shaft portion 321A and intervene between the cylindrical support portion 311 and the rotary shaft portion 321A while sandwiching the cam member 341 and the bearings 312 and 313 therebetween in the axial direction of the rotary shaft portion 321A, thereby providing a liquid-tight seal between the cylindrical support portion 311 and the rotary shaft portion 321A.

The axle hub 320 includes a hub body 321 and a sleeve 322, which is liquid-tightly screw-engaged with the outer circumference of an illustrated lower end portion of the hub body 321. The hub body 321 includes the rotary shaft portion 321A and an annular flange portion 321B. The rotary shaft portion 321A has a pair of axially elongated holes 321a and a cylinder bore 321b. The annular flange portion 321B has mounting portions 321c (detailed illustration is omitted) for a wheel (not shown). A suction path 321d and a discharge path 321e are formed in the rotary shaft portion 321A and in the annular flange portion 321B.

The paired axially elongated holes 321a collectively serve as a guide means for guiding the piston 330, the cam followers 342, and the shaft 343 in such a manner that these members are rotatable unitarily with the axle hub 320 and can axially reciprocate. The paired axially elongated holes 321a extend in the axial direction of the rotary shaft portion 321A and are spaced 180 degrees apart from each other in the circumferential direction of the rotary shaft portion 321A of the axle hub 320. The cylinder bore 321b extends in the axial direction of the rotary shaft portion 321A and accommodates the piston 330. The cylinder bore 321b, in cooperation with the piston 330, forms a pump chamber Ro in the rotary shaft portion 321A. The suction path 321d is adapted to lead (introduce) air into the pump chamber Ro and has the suction check valve Vi installed therein. The discharge path 321e is adapted to lead (discharge) air out from the pump chamber Ro and has the discharge check valve Vo installed therein. Pressurized air discharged from the pump chamber Ro can be supplied into a tire air chamber (not shown) of a wheel attached to the axle hub 320.

The piston 330 is inserted into the cylinder bore 321b of the rotary shaft portion 321A of the axle hub 320 via a pair of annular seal members 331 and 332 and is coaxially attached to the rotary shaft portion 321A of the axle hub 320 in a unitarily rotatable manner and in such a manner as to be able to axially reciprocate. The piston 330 has an annular groove 330a and a through hole 330b extending in a radial direction thereof. The paired annular seal members 331 and 332 are spaced a predetermined distance apart from each other in the axial direction of the piston 330 and intervene between the piston 330 and the rotary shaft portion 321A at respective axial end portions of the piston 330, thereby providing an airtight, liquid-tight seal between the piston 330 and the rotary shaft portion 321A.

The annular groove 330a is formed on the outer circumference of the piston 330 between the paired annular seal members 331 and 332, whereby an annular space R1 is formed between the piston 330 and the rotary shaft portion 321A. The annular space R1 communicates with an annular space R2 formed between the paired annular seal members 314 and 315, through the axially elongated holes 321a formed in the rotary shaft portion 321A. The annular spaces R1 and R2 remain unchanged in volume during axial reciprocating motion of the piston 330 and are sealed by means of the four seal members 314, 315, 331, and 332. The annular spaces R1 and R2 and the like collectively serve as an oil chamber for accommodating a predetermined amount of lubrication oil. This oil chamber accommodates the bearings 312 and 313, the cam member 341, the cam followers 342, the shaft 343, and the like.

The cam member 341 is a cylindrical cam attached unitarily (in an axially immovable manner and in a nonrotatable manner) to the cylindrical support portion 311 and consists of a pair of cam sleeves 341A and 341B, which are provided in axial contact with each other. The cam member 341 is disposed coaxially with the rotary shaft portion 321A. The cam member 341 has an annular cam portion 341a whose axial position varies. The cam portion 341a is a cam groove, into which the cam followers 342 are fitted. The cam portion 341a has a cam face which is subjected to an axial load (a vertical load in FIG. 6) and a radial load (a horizontal load in FIG. 6) from the cam followers 342. This cam face has a V-shaped cross section and has an even number of geometric cycles (e.g., two geometric cycles) along the circumferential direction of the rotary shaft portion 321A.

The cam followers 342 are balls which are rotatably attached, via respective rollers 344, to respective outer ends of the shaft 343 with respect to a radial direction of the piston 330, the shaft 343 being divided into two pieces within the piston 330. The cam followers 342 are engaged with the cam portion (cam groove) 341a at the end portions with respect to the piston radial direction orthogonal to the axis Lo. Through relative rotation in relation to the cam member 341, the cam followers 342, together with the shaft 343, can move in the axial direction of the rotary shaft portion 321A (vertically in FIG. 6).

The shaft 343 serves as a load transmission element, which is installed in the through hole 330b of the piston 330 in such a manner as to be movable in a radial direction of the piston 330 (the axial direction of the through hole 330b). The rollers 344 are attached to respective small-diameter end portions of the shaft 343. The shaft 343 extends through the axially elongated holes 321a of the rotational shaft portion 321A in such a manner as to be movable in the axial direction of the rotary shaft portion 321A through the rollers 344 and to be immovable in the direction of rotation of the rotary shaft portion 321A. A compression coil spring 345 is installed within the shaft 343 and applies force to the shaft 343 in a radially outward direction of the piston 330.

While being rotatably fitted to the respective small-diameter end portions of the shaft 343, the rollers 344 are rollably fitted into the respective axially elongated holes 321a of the rotary shaft portion 321A. The rollers 344 can roll along the respective axially elongated holes 321a of the rotary shaft portion 321A in association with the axial movement of the cam followers 342. Each of the rollers 344 has a hemispherically recessed bearing portion at its axially outer end. The bearing portions of the rollers 344 rollably support the respective cam followers (balls) 342.

The compression coil spring 345 is a pressing means for pressing the cam followers 342 in a radial direction of the piston 330 toward the cam portion (cam groove) 341a of the cam member 341 via the shaft 343 and the rollers 344. The compression coil spring 345 is installed in closed-bottomed mounting holes of the shaft 343 under predetermined preload.

In the thus-configured pressure-generating device AP4 of the fourth embodiment, when the axle hub 320 rotates in relation to the cylindrical support portion 311, the piston 330, the shaft 343, and the cam followers 342 rotate unitarily with the axle hub 320 and make relative rotation in relation to the cam member 341 to thereby move axially. Accordingly, the rotary motion of the axle hub 320 can be converted to the reciprocating motion of the piston 330. The reciprocating motion of the piston 330 can increase and decrease the volume of the pump chamber Ro. Thus, air can be introduced into the pump chamber Ro through the suction path 321d in which the suction check valve Vi is installed, and air can be discharged from the pump chamber Ro through the discharge path 321e in which the discharge check valve Vo is installed. The discharged air (pressurized air) can be supplied into the tire air chamber (not shown) of a wheel attached to the axle hub 320.

In the pressure-generating device AP4 of the fourth embodiment, the rotary shaft portion 321A of the axle hub 320 is supported rotatably in the cylindrical support portion 311 via the bearings 312 and 313, and the piston 330 is coaxially attached to the rotary shaft portion 321A of the axle hub 320 in a unitarily rotatable manner and in such a manner as to be able to axially reciprocate (to perform a pumping action), whereby the pump chamber Ro exposed to the rotary shaft portion 321A is formed. Accordingly, not only does the axle hub 320 not require a balance weight for achieving balance of rotation, but also the pressure-generating device AP4 can be configured compact within the cylindrical support portion 311, thereby enabling a reduction in the size of the pressure-generating device AP4.

In the fourth embodiment, since the compression coil spring 345 presses the cam followers 342 toward the cam portion (cam groove) 341a of the cam member 341, there can be suppressed the formation of clearance (play) in the axial and radial directions of the piston 330 which could otherwise arise between the cam followers 342 and the cam portion (cam groove) 341a of the cam member 341. Thus, there can be suppressed a motion conversion loss which could otherwise result from such clearance, whereby the efficiency of motion conversion can be improved.

In the fourth embodiment, the rotary shaft portion 321A has the axially elongated holes 321a for guiding the piston 330 and the cam followers 342 in such a manner that these members are rotatable unitarily with the rotary shaft portion 321A and can axially reciprocate, and the piston 330 is attached to the rotary shaft portion 321A in a unitarily rotatable manner and in such a manner as to be able to axially reciprocate. Thus, no torque is exerted on the annular seal members 331 and 332 intervening between the piston 330 and the rotary shaft portion 321A, so that the durability of the annular seal members 331 and 332 can be improved.

In the fourth embodiment, the rollers 344 are rotatably supported by the shaft 343 provided in the piston 330, and the cam followers 342 are rollably supported by the respective rollers 344 and are engaged with the cam portion (cam groove) 341a of the cam member 341. Accordingly, the rollers 344 can lower sliding resistance between the axially elongated holes 321a and the cam followers 342, and the cam followers 342 can lower sliding resistance against the cam portion (cam groove) 341a of the cam member 341, whereby the efficiency of motion conversion can be improved.

In the fourth embodiment, the paired annular seal members 331 and 332 for providing a liquid-tight seal between the piston 330 and the rotary shaft portion 321A of the axle hub 320 are axially spaced a predetermined distance apart from each other, and the paired annular seal members 314 and 315 for providing a liquid-tight seal between the rotary shaft portion 321A of the axle hub 320 and the cylindrical support portion 311 are axially spaced a predetermined distance apart from each other. The oil chamber (annular spaces R1 and R2), which is sealed by the four seal members 314, 315, 331, and 332 and accommodates operating oil in a predetermined amount, accommodates the bearings 312 and 313, the cam member 341, the cam followers 342, the shaft 343, the rollers 344, the compression coil spring 345, and the like. Accordingly, lubricity is ensured for sliding portions, so that the sliding portions can be improved in durability.

Figure 7:
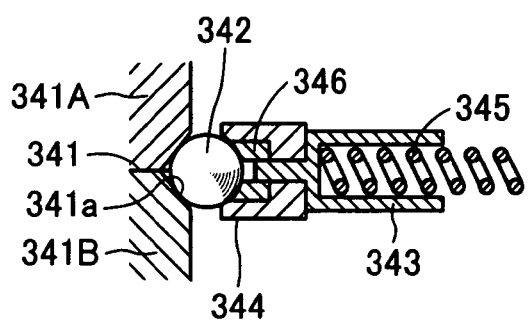
FIG. 7 is a sectional view showing essential portions of a modified embodiment in which a cam follower shown in FIG. 6 is rollably supported by a bearing attached to a roller.

In the above-described fourth embodiment, the cam followers 342 are rollably supported by the respective rollers 344. However, as shown in FIG. 7, the fourth embodiment may be configured such that bearings 346 may be attached to the respective rollers 344 so as to intervene between the rollers 344 and the corresponding cam followers 342, thereby rollably supporting the respective cam followers 342. In this case, the bearings 346 can lower sliding resistance between the rollers 344 and the corresponding cam followers 342, whereby the efficiency of motion conversion can be improved. Also, the fourth embodiment may be such that the shaft 343 extends through the rollers 344; i.e., the shaft (343) rollably support the cam followers (342) without intervention of the rollers (344) therebetween.

In the above-described fourth embodiment, the cam portion (cam groove) 341a of the cam member 341 has two geometric cycles along the circumferential direction of the rotary shaft portion 321A (the piston 330 makes two reciprocations while the rotary shaft portion 321A makes one rotation), and a pair of cam followers 342; i.e., two cam followers 342, are engaged with the cam portion (cam groove) 341a. However, as in the case of a fifth embodiment shown in FIG. 8, the fourth embodiment may be configured such that cam portions (cam concavity-convexity faces) 441a and 441b of cam ring plates 441A and 441B, respectively, of the cam member 441 have four geometric cycles along the circumferential direction of a rotary circumferential portion 421A and such that there are provided a pair of cam followers 442A; i.e., two cam followers 442A, engaged with the cam portion (cam concavity-convexity face) 441a of the cam ring plate 441A, and a pair of cam followers 442B; i.e., two cam followers 442B, engaged with the cam portion (cam concavity-convexity face) 441b of the cam ring plate 441B.

Figure 8:
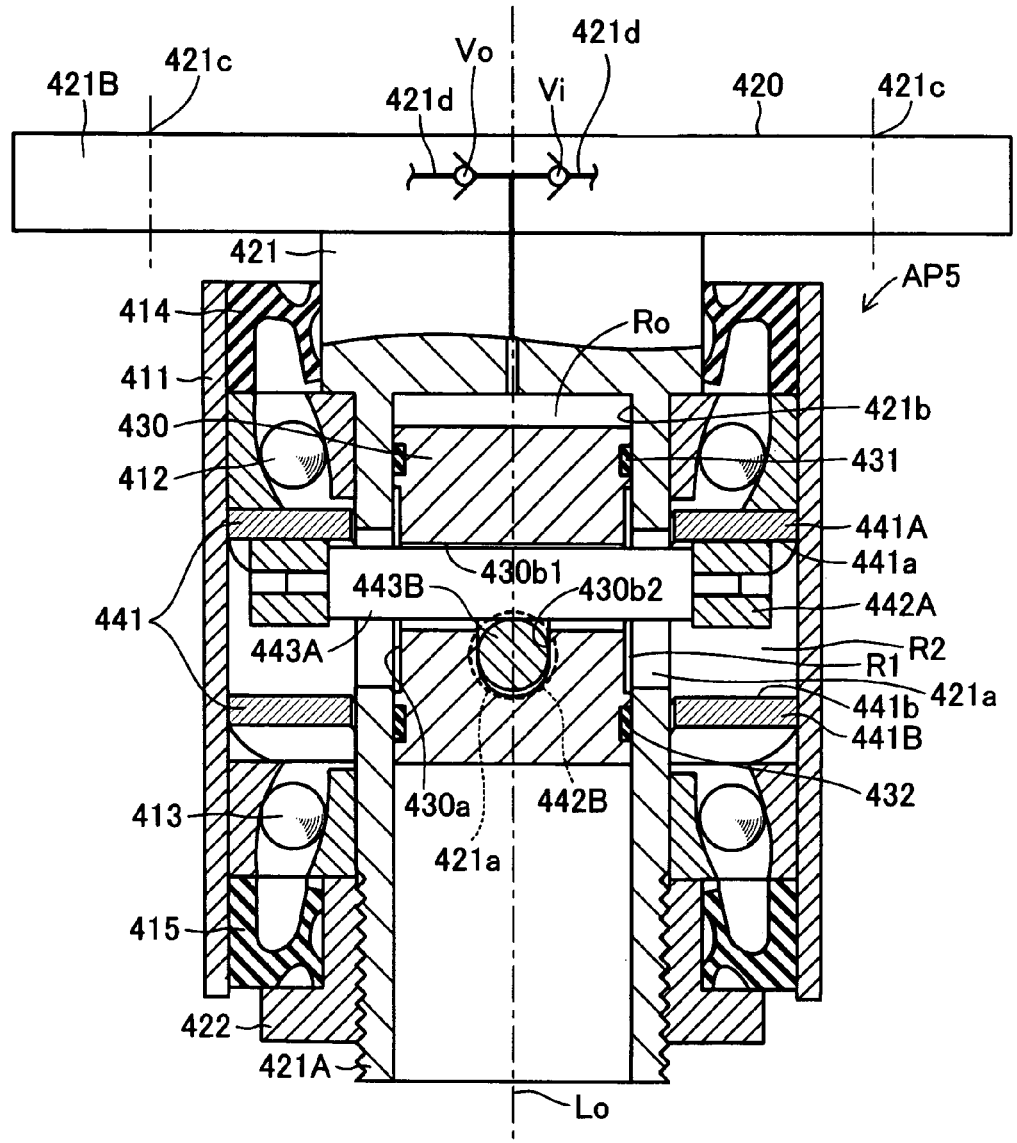
FIG. 8 is a sectional view schematically showing a fifth embodiment of a pressure-generating device according to the present invention.
Figure 9:
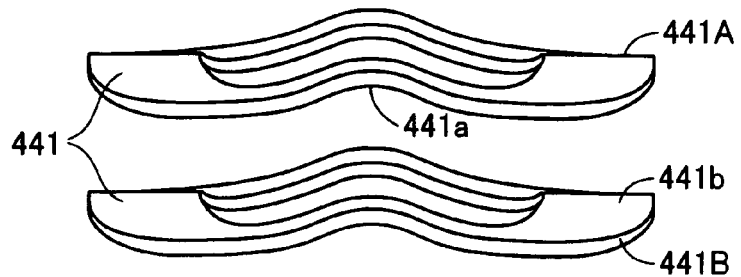
FIG. 9 is a perspective view of a cam member (a pair of cam ring plates) shown in FIG. 8.

In a pressure-generating device AP5 of the fifth embodiment shown in FIG. 8, the piston 430 has a pair consisting of an upper through hole 430b1 and a lower through hole 430b2 which are slightly offset from each other in the axial direction of the piston 430 and whose axes intersect with the axis of the piston 430. The cam member 441 consists of a pair of cam ring plates 441A and 441B, which are axially spaced a predetermined distance apart from each other. The cam member 441 is unitarily (in an axially immovable manner and in a nonrotatable manner) attached to a cylindrical support portion 411 and is disposed coaxially with the rotary shaft portion 421A.

The upper cam followers 442A are forward-movement cam followers (rollers) for moving the piston 430 forward (downward) and are rotatably attached to respective small-diameter end portions of an upper shaft 443A, which extends through the through hole 430b1 of the piston 430 and extends through axially elongated holes 421a of the rotary shaft portion 421A to thereby be guided for its axial movement. The upper cam followers 442A are rollably engaged with the cam portion (cam concavity-convexity face) 441a of the upper cam ring plate 441A.

The lower cam followers 442B are backward-movement cam followers (rollers) for moving the piston 430 backward (upward) and are rotatably attached to respective small-diameter end portions of a lower shaft 443B, which extends through the through hole 430b2 of the piston 430 and extends through the axially elongated holes 421a of the rotary shaft portion 421A to thereby be guided for its axial movement. The lower cam followers 442B are rollably engaged with the cam portion (cam concavity-convexity face) 441b of the lower cam ring plate 441B.

In the fifth embodiment, the upper cam followers (forward-movement cam followers) 442A and the lower cam followers (backward-movement cam followers) 442B are arranged alternately with one another at equal intervals along the circumferential direction of the rotary shaft portion 421A. The upper shaft 443A and the lower shaft 443B abut each other at their intermediate regions in a crossing manner, thereby pressing the upper cam followers 442A against the cam portion (cam concavity-convexity face) 441a of the upper cam ring plate 441A and pressing the lower cam followers 442B against the cam portion (cam concavity-convexity face) 441b of the lower cam ring plate 441B.

Structural features other than those described above of the fifth embodiment (structural features other than that of the piston 430 and those of the cam ring plates 441A and 441B and the cam followers 442A and 442B of the cam member 441) are similar to those of the above-described fourth embodiment and are thus denoted by like reference numerals of 400 numbers, and description thereof is omitted. In the fifth embodiment, the upper shaft 443A and the lower shaft 443B abut each other at their intermediate regions, thereby pressing the cam followers 442A and 442B against the cam portions (cam concavity-convexity faces) 441a and 441b, respectively; therefore, the equivalent of the compression coil spring 345 of the fourth embodiment is omitted.

In the thus-configured pressure-generating device AP5 of the fifth embodiment, when the axle hub 420 rotates in relation to the cylindrical support portion 411, the piston 430, the shafts 443A and 443B, and the cam followers 442A and 442B rotate unitarily with the axle hub 420 and make relative rotation in relation to the cam member 441 to thereby move axially. Accordingly, the rotary motion of the axle hub 420 can be converted to the reciprocating motion of the piston 430. The reciprocating motion of the piston 430 can increase and decrease the volume of the pump chamber Ro. Thus, air can be introduced into the pump chamber Ro through a suction path 421d in which the suction check valve Vi is installed, and air can be discharged from the pump chamber Ro through a discharge path 421e in which the discharge check valve Vo is installed. The discharged air (pressurized air) can be supplied into the tire air chamber (not shown) of a wheel attached to the axle hub 420.

In the pressure-generating device AP5 of the fifth embodiment, the rotary shaft portion 421A of the axle hub 420 is supported rotatably in the cylindrical support portion 411 via bearings 412 and 413, and the piston 430 is coaxially attached to the rotary shaft portion 421A of the axle hub 420 in a unitarily rotatable manner and in such a manner as to be able to axially reciprocate (to perform a pumping action), whereby the pump chamber Ro exposed to the rotary shaft portion 421A is formed. Accordingly, not only does the axle hub 420 not require a balance weight for achieving balance of rotation, but also the pressure-generating device AP5 can be configured compact within the cylindrical support portion 411, thereby enabling a reduction in the size of the pressure-generating device AP5.

In the fifth embodiment, since the shafts 443A and 443B press the respective cam followers 442A and 442B against the cam portions (cam concavity-convexity faces) 441a and 441b, respectively, there can be suppressed the formation of clearance (play) in the axial direction of the piston 430 which could otherwise arise between the cam followers 442A and 442B and the respective cam portions (cam concavity-convexity faces) 441a and 441b. Thus, there can be suppressed a motion conversion loss which could otherwise result from such clearance, whereby the efficiency of motion conversion can be improved.

In the fifth embodiment, the rotary shaft portion 421A has the axially elongated holes 421a for guiding the cam followers 442A and 442B in such a manner that these members are rotatable unitarily with the rotary shaft portion 421A and can axially reciprocate, and the piston 430 is attached to the rotary shaft portion 421A in a unitarily rotatable manner and in such a manner as to be able to axially reciprocate. Thus, no torque is exerted on annular seal members 431 and 432 intervening between the piston 430 and the rotary shaft portion 421A, so that the durability of the annular seal members 431 and 432 can be improved.

In the fifth embodiment, the cam followers 442A and 442B are rollers which are rollably engaged with the respective cam portions (cam concavity-convexity faces) 441a and 441b. Accordingly, the sliding resistance of the cam followers 442A and 442B against the respective cam portions (cam concavity-convexity faces) 441a and 441b can be lowered, whereby the efficiency of motion conversion can be improved.

In the fifth embodiment, the paired annular seal members 431 and 432 for providing a liquid-tight seal between the piston 430 and the rotary shaft portion 421A are axially spaced a predetermined distance apart from each other, and paired annular seal members 414 and 415 for providing a liquid-tight seal between the rotary shaft portion 421A and the cylindrical support portion 411 are axially spaced a predetermined distance apart from each other. The oil chamber (annular spaces R1 and R2), which is sealed by the four seal members 414, 415, 431, and 432 and accommodates operating oil in a predetermined amount, accommodates the bearings 412 and 413, the cam member 441, the cam followers 442A and 442B, the shafts 443A and 443B, and the like. Accordingly, lubricity is ensured for sliding portions, so that the sliding portions can be improved in durability.

The invention claimed is:

1. A pressure-generating device comprising:
    a rotary member having a rotary shaft portion supported rotatably in a nonrotatable support member via a first bearing;
    a pumping member attached to the rotary shaft portion of the rotary member in a unitarily rotatable manner and in such a manner as to be able to perform a pumping action, and, in cooperation with the rotary shaft portion, forming a pump chamber therebetween;
    a motion-converting mechanism for converting a rotary motion of the rotary member in relation to the support member to the pumping action of the pumping member;
    a suction path formed in the rotary member and enabling introduction of fluid into the pump chamber; and
    a discharge path formed in the rotary member and enabling discharge of the fluid from the pump chamber,
    wherein the rotary shaft portion has a coaxially formed cylindrical bore which accommodates the pumping member therein so that the pumping member can reciprocate in an axial direction of the rotary shaft portion.

2. A pressure-generating device according to claim 1, wherein the rotary member is an axle hub of a vehicle, the support member rotatably supports the axle hub, and the fluid is air.

3. A pressure-generating device according to claim 1, wherein the pumping member is a piston which is attached to the rotary shaft portion in a unitarily rotatable manner and in such a manner as to be able to reciprocate, and the motion-converting mechanism converts the rotary motion of the rotary member in relation to the support member to a reciprocating motion of the piston.

4. A pressure-generating device according to claim 3, wherein; the piston has a load transmission element which extends through the rotary shaft portion in such a manner that the load transmission element is movable in the axial direction of the rotary shaft portion and immovable in a direction of rotation of the rotary shaft portion and the motion-converting mechanism includes a cam follower provided at an outer end of the load transmission element with respect to a radial direction of the piston, and a cam member attached to the interior of the support member.

5. A pressure-generating device according to claim 3, wherein the piston is cylindrically formed and attached to an outer circumference of the rotary shaft portion in a unitarily rotatable manner and in such a manner as to be able to axially reciprocate; a cylinder member intervenes between the support member and the rotary shaft portion, is provided unitarily with the support member, and accommodates the piston in such a manner that the piston can reciprocate axially; and the motion-converting mechanism is provided between the piston and the cylinder member.

6. A pressure-generating device according to claim 3, wherein the accommodates the piston in such a manner that the piston can reciprocate in a radial direction of the rotary shaft portion, and the motion-converting mechanism comprises a cam follower provided at an outer end of the piston projecting outward from the cylinder bore, and a cylindrical cam attached to the interior of the support member.

7. A pressure-generating device according to claim 4, wherein the cam member has a cam groove into which the cam follower is fitted.

8. A pressure-generating device according to claim 7, wherein the cam groove has a cam face which is subjected to an axial load and a radial load from the rotary shaft portion via the cam follower.

9. A pressure-generating device according to claim 8, wherein the cam groove has a V-shaped cross section.

10. A pressure-generating device according to claim 7, wherein the cam follower fitted into the cam groove is a ball.

11. A pressure-generating device according to claim 4, wherein the load transmission element is a shaft which extends through the piston in a radial direction of the piston and whose axial movement is guided by an axially elongated hole formed in the rotary shaft portion.

12. A pressure-generating device according to claim 11, wherein the shaft is divided into two pieces within the piston, and a spring intervening between the two pieces applies a radially outward force to the two pieces in a radial direction of the piston.

13. A pressure-generating device according to claim 11, wherein a roller intervenes between the axially elongated hole and the shaft and rolls along the axially elongated hole as the shaft moves in the axial direction of the rotary shaft portion.

14. A pressure-generating device according to claim 13, wherein the roller has a bearing which rollably supports the cam follower.

15. A pressure-generating device according to claim 4, wherein the cam member enables the cam follower to axially reciprocate in an even number of geometric cycles in a circumferential direction of the rotary member, and the cam followers are provided in a number equal to the number of geometric cycles.

16. A pressure-generating device according to claim 15, wherein the cam member comprises a forward-movement cam and a backward-movement cam which are spaced a predetermined distance apart from each other in the axial direction of the rotary shaft portion; the cam followers comprise forward-movement cam followers engaged with the forward-movement cam and backward-movement cam followers engaged with the backward-movement cam; the number of geometric cycles in an even number is four; and the forward-movement cam followers and the backward-movement cam followers are arranged alternately with one another at circumferentially equal intervals.

17. A pressure-generating device according to claim 16, wherein the frontward-movement cam and the backward-movement cam are cam ring plates, respectively; the frontward-movement cam followers and the backward-movement cam followers are rollers, respectively; and the rollers are rollably engaged with the respective cam ring plates.

18. A pressure-generating device according to claim 1, wherein the rotary shaft portion is rotatably supported by the support member via the first bearing and a second bearing which are axially spaced a predetermined distance apart from each other.

19. A pressure-generating device according to claim 18, wherein the motion-converting mechanism intervenes between the first bearing and the second bearing.

20. A pressure-generating device according to claim 19, wherein a first seal member and a second seal member for sealing the first and second bearings intervene between the rotary shaft portion and the support member in such a manner as to sandwich the motion-converting mechanism and the first and second bearings in the axial direction.

* * * * *

UNITED STATES PATENT AND TRADEMARK OFFICE
CERTIFICATE OF CORRECTION

PATENT NO. : 7,922,459 B2  
APPLICATION NO. : 11/662709  
DATED : April 12, 2011  
INVENTOR(S) : Hiroshi Isono Page 1 of 1

It is certified that error appears in the above-identified patent and that said Letters Patent is hereby corrected as shown below:

On the title page, Item (86), the PCT No. is incorrect. Item (86) should read:

-- (86) PCT No.: PCT/JP2006/307172  
§ 371 (c)(1),  
(2), (4) Date: Mar. 14, 2007 --

Signed and Sealed this  
Thirty-first Day of May, 2011

David J. Kappos  
*Director of the United States Patent and Trademark Office*